UNITED STATES PATENT OFFICE.

DANIEL M. LAMB, OF BOSTON, MASSACHUSETTS.

COMPOSITION FOR ELECTRIC BATTERIES.

SPECIFICATION forming part of Letters Patent No. 461,024, dated October 13, 1891.

Application filed April 10, 1890. Serial No. 347,386. (No specimens.)

*To all whom it may concern:*

Be it known that I, DANIEL MARTIN LAMB, a citizen of the United States, residing at Boston, in the county of Suffolk and State of Massachusetts, have invented certain new and useful Improvements in Electric Batteries, of which the following is a specification.

In a pending application for Letters Patent, Serial No. 332,992, filed December 7, 1889, I have described the components of a battery as consisting of certain pulverized ingredients, the particles of which are enveloped with a resinous water-repellent substance or composition.

My present invention consists in an improvement in the composition constituting the active elements of the battery set forth in the above-entitled application, the most important addition thereto consisting of alumina or clay and gypsum or plaster-of-paris. The proportions of this compound may be varied within certain limits without departing from the spirit of my invention, and well-known chemical equivalents may be substituted for some of them; but as the results of my experiments I prefer the following ingredients and proportions treated in the way described: Bichromate of soda, six ounces; carbonate of soda, two ounces; sal-ammoniac, four ounces; sulphate of copper, two ounces; free sulphur, one ounce; black oxide of manganese, ten to twelve ounces; blue clay, thirteen ounces; gypsum, six ounces; rosin, one to four ounces. These ingredients are thoroughly mixed with great care in the form of dry powder and then exposed in an oven or retort to a sufficient heat to melt the rosin without burning it, the mixture being mechanically stirred while heated in well-known ways. The heat drives out the moisture and promotes chemical reaction, which causes the mixture to "boil up" or swell, creating an active movement of the particles among themselves and an intimate admixture, the result being that the particles are individually coated with the resinous material, so as to constitute a granulated or pulverized compound.

What I claim as of my own invention is—

1. The combination of pulverized clay and calcined gypsum with the active material of a battery, substantially as and in about the proportions herein set forth.

2. Battery active material consisting of powdered bichromate of soda, carbonate of soda, sal-ammoniac, sulphate of copper, free sulphur, black oxide of manganese, clay, gypsum, and a resinous water-repellent coating or envelope surrounding each granule or particle of the mixture.

3. The combination, substantially as and in about the proportions specified, of powdered bichromate of soda, carbonate of soda, sal-ammoniac, sulphate of copper, free sulphur, black oxide of manganese, clay, gypsum, and rosin, all pulverized, heated, mixed, and the resulting granules or particles thereby enveloped with the resinous water-repellent material.

In testimony whereof I have hereunto subscribed my name.

DANIEL M. LAMB.

Witnesses:
W. D. BALDWIN,
LLOYD B. WIGHT.